(No Model.)
A. GROSS.
ELEVATOR AND HOIST.
No. 426,531. Patented Apr. 29, 1890.
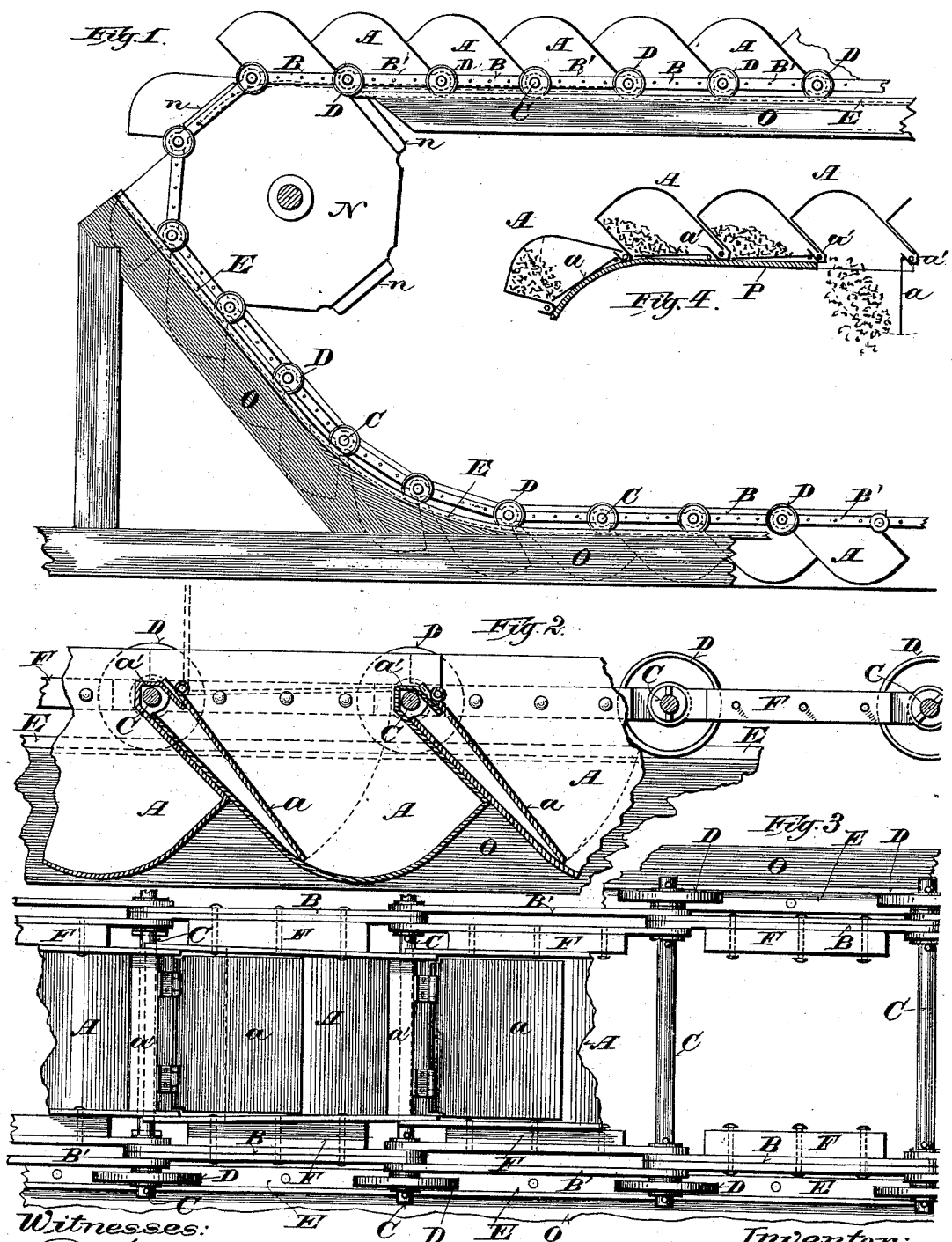

UNITED STATES PATENT OFFICE.

ADAM GROSS, OF MILWAUKEE, WISCONSIN.

ELEVATOR AND HOIST.

SPECIFICATION forming part of Letters Patent No. 426,531, dated April 29, 1890.

Application filed March 14, 1889. Serial No. 303,214. (No model.)

*To all whom it may concern:*

Be it known that I, ADAM GROSS, of Milwaukee, in the county of Milwaukee and State of Wisconsin, have invented certain new and useful Improvements in Elevators and Hoists; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to convey, hoist, and distribute coal and other materials.

In the accompanying drawings, like letters designate the same parts in the several figures.

Figure 1 is a side elevation of a portion of my conveyer and hoist. Fig. 2 is a vertical longitudinal section, on an enlarged scale, of a portion of the device. Fig. 3 is a plan view of the same, and Fig. 4 is a vertical section showing one method of discharging the contents of the buckets.

A A represent buckets, preferably formed of some suitable sheet metal and bolted at the sides through wooden cleats F F to the adjacent links B B' of the carrying-chains. The links of the carrying-chains are preferably formed each of two metallic plates perforated at the ends to receive the cross-shafts C C, by which they are connected. The closed links B B, formed of two plates placed close together, alternate with the open links B', composed of two like plates, between the ends of which the ends of the links B B are interposed. The shafts C C are held in place in said links by pins and washers, as shown in Figs. 2 and 3, or by other suitable means.

Upon the projecting ends of the shafts C C are journaled the supporting and guiding wheels D D.

The buckets A A are placed close together and are formed with rearwardly-inclined sides, so that each bucket will extend underneath the following bucket when the carrying-chains are straight, and their adjacent inclined sides will be brought close together. The rear side of each bucket is bent at its upper edge $a'$ over the adjacent cross-shaft C, so as to overhang the upper edge of the front side of the next following bucket. In this way the space between the buckets is always covered whatever their relative position may be, and coal, &c., is prevented from falling between them. The ends of each bucket at its front side overlap the ends of the preceding bucket at its rear side, as shown in Fig. 3.

N represents a sprocket-wheel, over which the conveyer passes, formed with polygonal faces corresponding with the links B B' of the carrying-chains, the alternate faces being provided with sprockets $n$ $n$, which engage with the open links B' B'. The conveyer and hoist may be driven through a pair of these sprocket-wheels by any suitable mechanism, and may pass over similar sprocket-wheels or drums located in various positions, according to the work to be done, the height to which the coal, &c., is to be raised, the distance it is to be carried, and the points at which it is to be discharged, &c.

E E are angle-iron ways attached to stringers O O or suitable frame-work in position to be traversed by the wheels D D and to support and guide the conveyer and hoist in its proper position.

I may provide the several buckets A A with lids $a$ $a$, hinged thereto at the upper edges of their front sides, so as to swing inwardly against the front rearwardly-inclined sides of said buckets when the same are held in an upright position, as shown in Fig. 2, and so as to swing outwardly and close the openings into said buckets when they are inverted, as shown in Fig. 4. The upper edges $a'$ of the rear sides of the buckets are bent at angles over the cross-shafts C, as shown in Fig. 2, and present plain faces close to the free edges of lids $a$ $a$ when the same are closed. When the buckets are used without the lids $a$ $a$, the contents is discharged as they are inverted in passing over a drum or sprocket-wheels into spouts or chutes, (not shown,) which deliver it at the desired point or points. When the lids are employed, a deck or platform P is provided between the ways E E for them to rest upon when the buckets are inverted, as shown in Fig. 4, and the contents of the buckets is discharged through an opening in said deck or platform at the desired point or into a chute or spout, (not shown,) by which it is delivered and distributed as desired.

My improved conveyer and hoist operate as follows: The coal, or whatever material is to be conveyed therein, is deposited by any suitable means—spouts, chutes, or otherwise—into the buckets A A as they are passing in an upright position along the lower side of the endless chain, and are carried therein the desired distance horizontally, or in an inclined position, or directly upward over a drum or sprocket-wheels N N, and discharged therefrom as the buckets are inverted, either directly into the receptacle therefor or into chutes, to be distributed and deposited as desired. When the lids $a$ $a$ are used, the contents of the buckets falls into the lower portions thereof as they ascend, thereby allowing the lids to close as the buckets are inverted and retain the contents therein until the opening in the deck or platform P is reached, through which opening said contents is discharged, as previously described.

I do not wish to confine myself to the precise details of construction and arrangement shown in the drawings, inasmuch as they are susceptible of various modifications within the intent and meaning of my invention.

I claim—

1. In a conveyer and hoist, the combination of two carrying-chains, supporting-drums over which said chains run, and a series of rearwardly-inclined buckets attached to said chains at the sides, with their inclined ends close together when the chains are straight and opening inwardly toward the drums over which they pass, said buckets being so fixed to said chains that the plane of their openings will follow the direction of said chains, substantially as and for the purposes set forth.

2. In a conveyer and hoist, the combination of carrying-chains, drums over which said chains run, and a series of buckets inclined rearwardly toward their bottoms, attached at the sides to said chains, with their inclined ends close together when the chains are straight and opening adjacent to said chains toward the drums over which they run, each bucket having at one end of the opening therein a flange overlapping the adjacent edge of the next bucket where they are hinged together, so as to close the space between them, substantially as and for the purposes set forth.

3. In a conveyer and hoist, the combination of a pair of chains mounted upon suitable drums, so as to run along its lower side approximately in a horizontal position and to ascend therefrom to the level at which the material is to be discharged, a series of buckets inclined rearwardly toward their bottoms, attached at the sides to said chains, with their inclined ends close together and opening adjacent to the chains toward the drums over which they run, said buckets being hinged together adjacent to their openings and each having a flange at one end of the opening therein overlapping the adjacent edge of the next bucket, wheels journaled at the sides of the buckets, and ways upon which said wheels run between the drums carrying the chains, substantially as and for the purposes set forth.

4. In a conveyer and hoist, the combination of a number of buckets inclined rearwardly at the bottom and connected in an endless series, lids hinged at one edge to the tops of said buckets, so as to swing inside of said buckets when they are in upright positions, and to swing outwardly and close the same when they are inverted, substantially as and for the purposes set forth.

5. In a conveyer and hoist, the combination of a number of buckets rearwardly inclined at the bottom and connected in series, drums or wheels over which said series of buckets run, a deck having an opening over which the buckets pass when inverted, and lids hinged to said buckets so as to swing inside thereof when they are in an upright position and so as to swing outwardly and close the same when they are inverted, substantially as and for the purposes set forth.

In testimony that I claim the foregoing as my own I affix my signature in presence of two witnesses.

ADAM GROSS.

Witnesses:
  CHAS. L. GOSS,
  E. G. ASMUS.